US007054146B2

(12) United States Patent
Sutton et al.

(10) Patent No.: US 7,054,146 B2
(45) Date of Patent: May 30, 2006

(54) METHOD FOR MANUFACTURING AND KIT FOR ASSEMBLING A PERSONAL ENTERTAINMENT DEVICE (PED) WITH DOUBLE-OPENING FLAP

(75) Inventors: Thomas Sutton, Milan (IT); Gabriele Diotti, Bollate (IT)

(73) Assignee: Flextroncis AP, LLC, Niwot, CO (US)

( * ) Notice: Subject to any disclaimer, the term of this patent is extended or adjusted under 35 U.S.C. 154(b) by 79 days.

(21) Appl. No.: 10/781,399

(22) Filed: Feb. 17, 2004

(65) Prior Publication Data

US 2004/0194276 A1 Oct. 7, 2004

Related U.S. Application Data

(60) Provisional application No. 60/448,982, filed on Feb. 19, 2003.

(51) Int. Cl.
*G06F 1/16* (2006.01)

(52) U.S. Cl. ............... 361/680; 361/681; 361/683; 345/169; 455/560

(58) Field of Classification Search ............... 361/679, 361/680, 681, 682, 683; 455/556, 560, 575, 455/575.1, 161.1, 184.1, 550.01; 348/14.01, 348/14.02, 14.03, 14.04, 14.65; 345/168, 345/169, 172; 340/7.1, 571, 583; 400/489, 400/709.1, 715; 379/433.11, 433.12, 433.13, 379/433.04; 312/401, 405, 319.1–319.6, 312/307, 324, 326–329; 248/917–923
See application file for complete search history.

(56) References Cited

U.S. PATENT DOCUMENTS

| 4,249,734 | A | 2/1981 | Bromley | 273/94 |
|---|---|---|---|---|
| D297,735 | S | 9/1988 | Soren et al. | D14/64 |
| D326,091 | S | 5/1992 | Kikuchi | D14/138 |
| 5,189,632 | A | 2/1993 | Paajanen et al. | 364/705.05 |
| 5,278,779 | A | 1/1994 | Conway et al. | 364/708.1 |
| 5,644,338 | A | 7/1997 | Bowen | 345/168 |
| D382,545 | S | 8/1997 | Imai et al. | D14/100 |
| 5,907,615 | A | 5/1999 | Kaschke | 379/433 |
| 5,991,644 | A | 11/1999 | Ogawa | 455/566 |
| 6,122,526 | A | 9/2000 | Parulski et al. | 455/556 |

(Continued)

FOREIGN PATENT DOCUMENTS

JP 10-215304 1/1998

(Continued)

OTHER PUBLICATIONS

Sony Ericsson P800, http://www.phonescoop.com/phones/phone.php?p=119, p. 1-3.

(Continued)

*Primary Examiner*—Michael Datskovskiy
(74) *Attorney, Agent, or Firm*—Haverstock & Owens LLP (57) ABSTRACT

In a method of manufacturing an electronic device, a first side edge of a first substantially planar panel including a display is hingedly coupled to a second substantially planar panel selected from a first set of panels. The second panel includes a first interface. A second side edge of the first panel is hingedly coupled to a third substantially planar panel selected from a second set of panels. The third panel includes a second interface. A kit to assemble an electronic device comprises three substantially planar panels. A first panel includes a display. A second panel includes a first interface and is configured to be hingedly coupled to a first side edge of the first panel. A third panel includes a second interface and is configured to be hingedly coupled to a second side edge of the first panel.

24 Claims, 5 Drawing Sheets

U.S. PATENT DOCUMENTS

| | | |
|---|---|---|
| 6,297,752 B1 | 10/2001 | Ni ................................ 341/22 |
| 6,466,202 B1 | 10/2002 | Suso et al. .................. 345/169 |
| 6,510,325 B1 | 1/2003 | Mack, II et al. ............. 455/550 |
| 6,542,354 B1 | 4/2003 | Holtorf et al. ............... 361/680 |
| 6,542,721 B1 | 4/2003 | Boesen ........................ 455/90 |
| 6,580,932 B1 * | 6/2003 | Finke-Anlauff ............. 455/566 |
| 6,628,508 B1 | 9/2003 | Lieu et al. ................... 361/680 |
| 6,628,970 B1 | 9/2003 | Nishiyama et al. ......... 455/564 |
| 6,658,272 B1 | 12/2003 | Lenchik et al. ............. 455/575 |
| 6,661,404 B1 | 12/2003 | Sirola et al. ................. 345/168 |
| D487,066 S | 2/2004 | Gartrell et al. ............. D14/138 |
| 6,731,912 B1 | 5/2004 | Miyashita ................... 455/90.2 |
| 6,748,242 B1 | 6/2004 | Dunleavy .................... 455/566 |
| 6,766,182 B1 | 7/2004 | Janninck et al. .......... 455/575.3 |
| 6,801,796 B1 | 10/2004 | Finke-Anlauff .......... 455/575.3 |
| 2002/0006815 A1 | 1/2002 | Finke-Anlauff ............. 455/575 |
| 2002/0068619 A1 | 6/2002 | Nagai .......................... 455/575 |
| 2002/0102946 A1 | 8/2002 | SanGiovanni ................ 455/90 |
| 2002/0190952 A1 | 12/2002 | Shah ............................ 345/163 |
| 2003/0087663 A1 | 5/2003 | Finke-Anlauff ............. 455/550 |
| 2003/0211874 A1 | 11/2003 | Mizuta et al. ............. 455/575.4 |
| 2004/0097261 A1 | 5/2004 | Ujii ........................... 455/556.1 |
| 2004/0121825 A1 | 6/2004 | Ma et al. ................... 455/575.4 |
| 2004/0121826 A1 | 6/2004 | Ma et al. ................... 455/575.4 |
| 2004/0166829 A1 | 8/2004 | Nakae et al. ................ 455/403 |
| 2005/0017953 A1* | 1/2005 | Pekka ......................... 345/169 |
| 2005/0020323 A1 | 1/2005 | Kim ......................... 455/575.1 |

FOREIGN PATENT DOCUMENTS

| | | |
|---|---|---|
| JP | P2002-158518 A | 11/2000 |

OTHER PUBLICATIONS

Sony Ericsson P900, http://www.phonescoop.com/phones/phone.php?p=403, p. 1-3.

Sierra Wireless Voq A11, http://www.phonescoop.com/phones/phone.php?p=395, p. 1-3.

Nokia 6800, http://www.phonescoop.com/phones/phone.php?p=224, p. 1-3.

Nokia N-Gage, http://www.phonescoop.com/phones/phone.php?p=264, p. 1-3.

Sony Ericsson Z200, http://www.phonescoop.com/phones/phone.php?p=374, p. 1-3.

Danger hiptop/Sidekick, http://www.phonescoop.com/phones/phone.php?p=307, p. 1-3.

Siemens SL55, http://www.phonescoop.com/phones/phone.php?p=279, p. 1-3.

* cited by examiner

METHOD FOR MANUFACTURING AND KIT FOR ASSEMBLING A PERSONAL ENTERTAINMENT DEVICE (PED) WITH DOUBLE-OPENING FLAP

RELATED APPLICATIONS

This application claims priority under 35 U.S.C. § 119(e) of the co-pending U.S. provisional application Ser. No. 60/448,982, filed on Feb. 19, 2003 and entitled "SMARTPHONE WITH NOVEL OPENING MECHANISM AND PERSONAL ENTERTAINMENT DEVICE (PDE) WITH DOUBLE-OPENING FLAP." The provisional application Ser. No. 60/448,982, filed on Feb. 19, 2003 and entitled "SMARTPHONE WITH NOVEL OPENING MECHANISM AND PERSONAL ENTERTAINMENT DEVICE (PDE) WITH DOUBLE-OPENING FLAP" is also hereby incorporated by reference.

FIELD OF THE INVENTION

The present invention relates to the field of personal entertainment, electronic and communication devices. More particularly, the present invention relates to the field of cost effective manufacturing of more than one version of a personal entertainment device in a compact format.

BACKGROUND OF THE INVENTION

Conventional personal entertainment devices (PEDs) are limited both in scope and inventory because the format of conventional PEDs is fixed according to the product design and permanent. At the manufacturing stage, conventional PEDs are designed with an inflexible, fixed layout that does not allow for modifications at short notice. In particular, conventional PEDs do not allow for optional interfaces to be interchanged at the manufacturing stage, to increase the possible combinations of interfaces and panels comprising the PEDs. The current fixed nature of conventional PEDs thus limits the variety of PEDs available to consumers, causing many consumers to purchase more than one PED to satisfy their leisure needs and also requires manufacturers to design and inventory multiple products.

What is needed is a method of manufacturing personalized personal entertainment devices to meet the needs of a broad spectrum of consumers. Specifically, to address the problems noted above, what is needed is a method of manufacturing and a kit to assemble a personal entertainment device that accommodates a variety of combinations of interfaces and panels.

SUMMARY OF THE INVENTION

The present invention is directed to manufacturing an electronic device comprising interchangeable designated panels. The property of panels being interchangeable at the manufacturing stage advantageously increases the number of possible combinations of various interfaces that the electronic device can possess. The device can have combinations of gaming interfaces, keyboard interfaces, PDA technology interfaces, music listening interfaces, video player interfaces, and the like. By having the capacity to include a number of possible combination of interfaces on designated panels, the device can be customized based on the growing leisure needs of consumers.

Preferably, the electronic device is a handheld portable device. Preferably, the electronic device is an entertainment device. Based upon the selection of designated panels for the device, the device can be a music listening device, a gaming device, a personal entertainment device (PED), a personal digital assistant (PDA), a web browser, or any other type of personal entertainment device (PED).

In one embodiment of the present invention, a method of manufacturing an electronic device having at least three substantially planar panels comprises three steps. The first step is to provide a first panel having a display, a first side edge, and a second side edge. The second step is to hingedly couple the first side edge of a first substantially planar panel to a second substantially planar panel. The second panel includes a first interface and is selected from a first set of panels. The third step is to hingedly couple a third substantially planar panel to the second side edge of the first panel. The third panel includes a second interface and is selected from a second set of panels. Preferably the second panel includes a third interface on an opposite face from the first interface. When the device is in a first position the first interface and the second interface are obscured while the third interface is exposed. When the device is in a second position the first interface and the second interface are exposed while the third interface is exposed. The third interface is preferably a music playing interface, such as for MP3 music files, such that the device can play music while the flaps are closed when the device is in the first position. Further, an operator can selectively access the first interface alone, the second interface alone, and both the first interface and the second interface when the device is in the second position.

In another embodiment of the present invention, the method of manufacturing the electronic device further comprises the step of operatively coupling the first panel to the second panel and the third panel. The first, second, and third panels are configured to exchange electronic data signals. Also, when the device is configured in the first position, no interface controls the display. Alternatively, when the device is configured in the first position, the third interface, preferably a music player interface, controls the display. When the device is configured in the second position, the display is selectively controlled by the first interface alone, the second interface alone, and both the first and second interfaces.

In yet another embodiment of the present invention, a kit to assemble an electronic device comprises three substantially planar panels. The first panel includes a display and has a first side edge and a second side edge. The second panel is configured to be hingedly coupled to the first side edge of the first panel. The second panel includes a first interface and is selected from a first set of panels. The third panel includes a second interface and is configured to be hingedly coupled to the second side edge of the first panel. The third panel is selected from a second set of panels and includes a second interface. Preferably the second panel includes a third interface on an opposite face from the first interface. The third interface is preferably a music playing interface, such as for MP3 music files, such that the device can play music while the flaps are closed when the device is in the first position. When the device is in the first position the first and second interfaces are obscured while the third interface is exposed. When the device is in the second position the first and second interfaces are exposed while the third interface is exposed. Thus, when the device is in the second position, an operator can selectively access the first interface alone, the second interface alone, and both the first and the second interfaces.

DETAILED DESCRIPTION OF THE PRESENT INVENTION

There are a number of conventional personal entertainment devices (PEDs) and personal digital assistants (PDAs) commercially available. Hereafter, both PEDs and PDAs will collectively be referred to as PEDS to avoid obscuring the invention with extraneous details. Conventional PEDs are problematic as they are fixed by design, especially during the manufacturing stage. In particular, conventional PEDs fail to allow last-minute changes in interfaces, elements, functions, and specific panels of the devices. Oftentimes, to satisfy their multiple personal needs, consumers are forced to purchase multiple PEDs, which can quickly become price prohibitive for the average consumer. Also, consumers do not want to carry multiple bulky PEDs for their personal needs, since PEDs are meant to be portable and lightweight devices and ideally, consumers want to satisfy all their personal needs in one compact PED.

The present invention advantageously solves these problems through a method of manufacturing and a kit to assemble an electronic device having a double flap and a display. According to the present invention, the device at the manufacturing stage has the flexibility of interchangeable device panels which include separate interfaces. Each interchangeable panel is selected from a groups of panels specifically configured to be a component of the device. Thus, at the manufacturing stage, a manufacturing company can manufacture multi-paneled PEDs with the flexibility to allow for last-minute changes and modifications, to include certain combinations of PED interfaces in high demand by consumers. For instance, a manufacturing company can manufacture in succession a first PED with panels including a gaming interface and a keyboard interface, a second PED with panels including a music player interface and a gaming interface, followed by a third PED with panels including a video teleconference interface and a PDA (personal digital assistant) interface. Each of these first, second and third PEDs can include a common control and display panel.

By having the flexibility of choosing which interchangeable panels to couple in a particular PED at the manufacturing stage, the manufacturing company can also easily meet the present demands of the ever-changing market industry of PEDs. A company no longer has to take the financial risk of manufacturing and inventorying multiple conventional fixed PEDs. Instead, a company can gain consumer feedback prior to manufacturing further PEDs and can mix and match interchangeable panels with the interfaces in highest demand.

Figure 1:
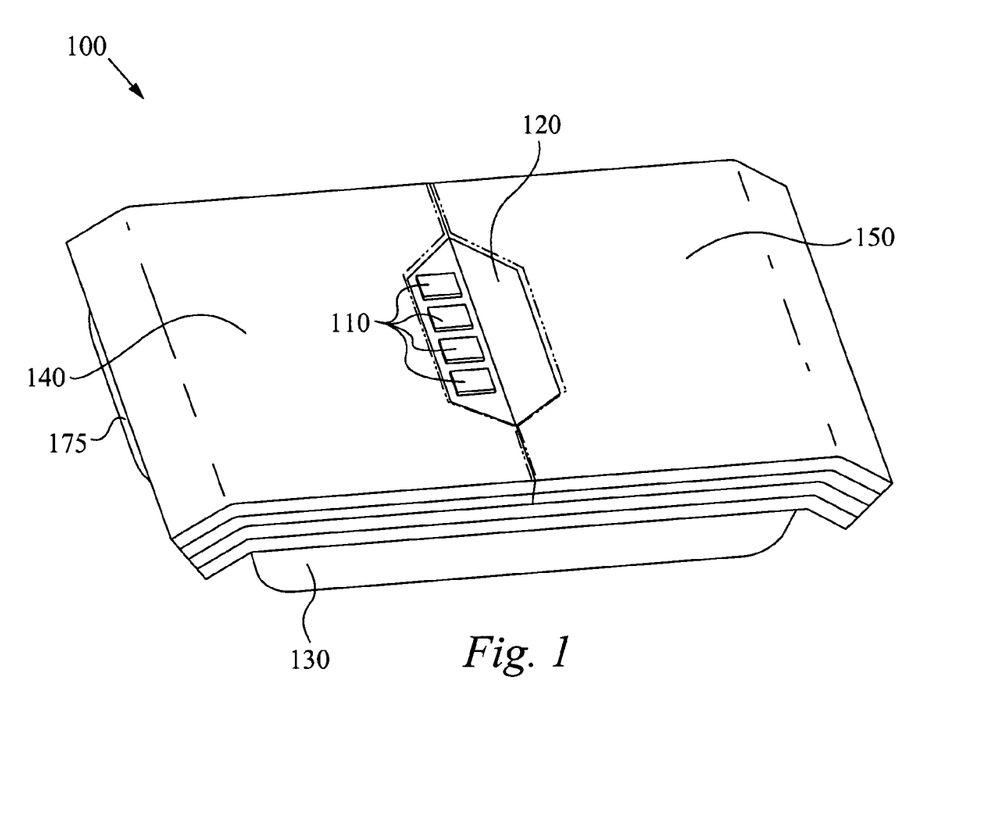
FIG. 1 shows an electronic device with three substantially planar panels in a first position.
Figure 2A:
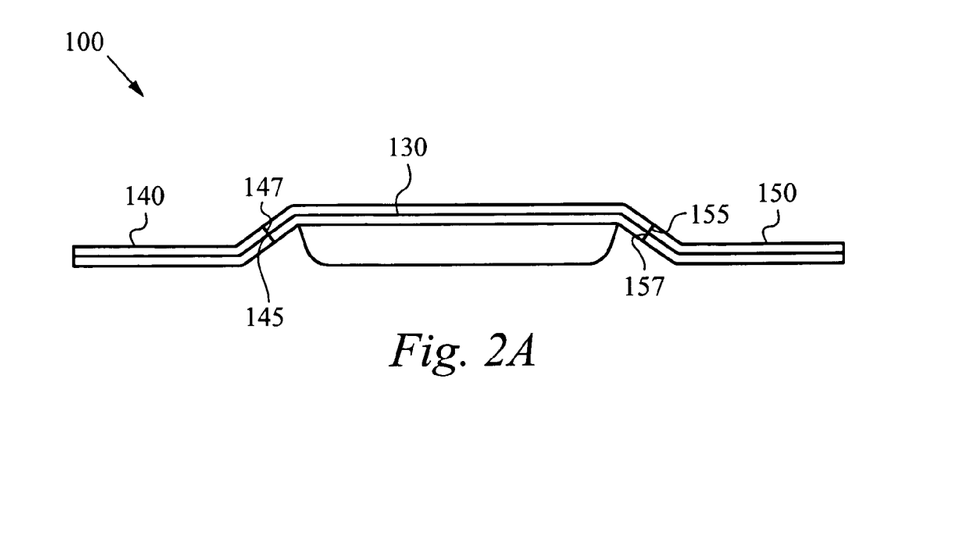
FIGS. 2A and 2B show the electronic device of FIG. 1 in a second position from a side view and a top view, respectively.
Figure 2B:
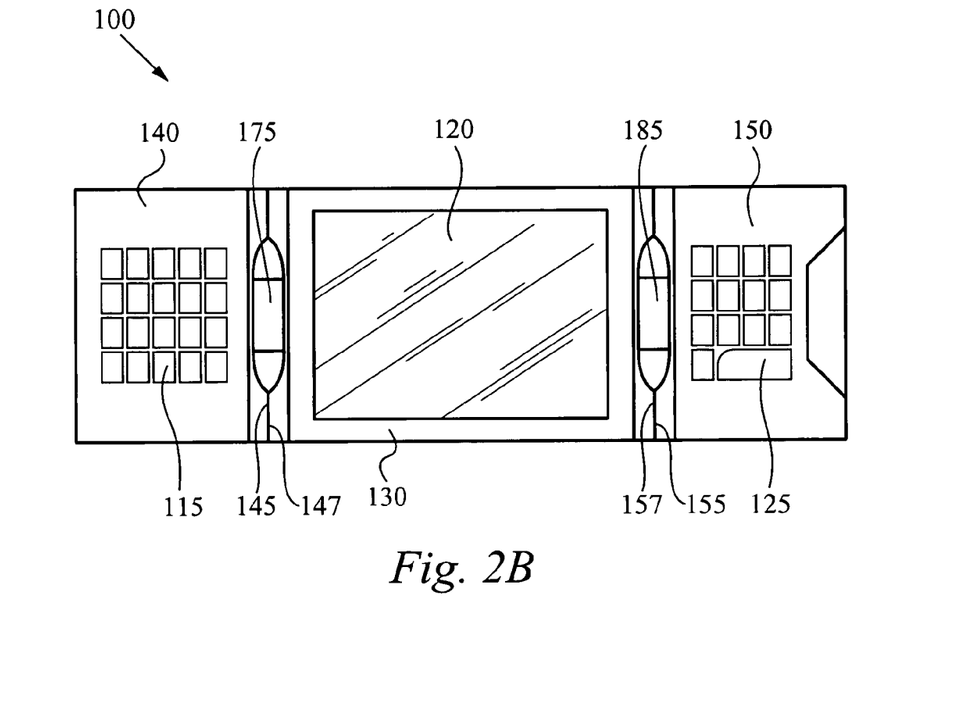

The electronic device is preferably a portable PED and it comprises three substantially planar panels. To explain the various steps of the preferred method of manufacturing the electronic device and the kit to assemble such a device, it is necessary to explain the format of the electronic device, complete with the first, second, and third substantially planar panels. The preferred embodiments of the electronic device are described in U.S. patent application No. Ser. No. 10/781,400, filed on Feb. 17, 2004, and entitled "PERSONAL ENTERTAINMENT DEVICE (PED) WITH DOUBLE-OPENING FLAP," which is incorporated by reference in its entirety. However, FIGS. 1, 2A and 2B are provided as a brief overview of the components and functions of the electronic device described in more detail in U.S. patent application No. Ser. No. 10/781,400, filed on Feb. 17, 2004, and entitled "PERSONAL ENTERTAINMENT DEVICE (PED) WITH DOUBLE-OPENING FLAP."

FIG. 1 shows the electronic device 100 comprising a first substantially planar panel 130, a second substantially planar panel 140 and a third substantially planar panel 150. According to the preferred embodiment, as shown in FIG. 1, the first panel 130 includes a display 120 which can be partially seen through an opening between the second panel 140 and the third panel 150, as shown in FIG. 1. When the device 100 is configured in the first position, the second panel 140 and the third panel 150 are folded over the first panel 130. The second panel 140 includes a first interface (not shown) and the third panel 150 includes a second interface (not shown). In the preferred embodiment, the second panel 140 further includes a third interface having interface buttons 110 on the opposite face of the first interface (not shown). As shown in FIG. 1, the interface buttons 110 are exposed when the device 100 is configured in the first position, so the device 100 can operate as a music player, for example, to play MP3 files, when the second panel 140 and the third panel 150 are folded over the first panel 130. Thus, the first position is also referred to as a closed position. Also, the second panel 140 and the third panel 150 are described herein as the flaps of the device 100, since the second panel 140 and the third panel 150 can hingedly open and close over the first panel 130, depending on the configuration of the device 100. When the device 100 is in the first position, in the preferred embodiment, the first interface and the second interface are obscured. In the preferred embodiment, when the device 100 is in the first position, the interface buttons 110 of the third interface are exposed and accessible. In certain alternative embodiments, no music playing interface is present on the back of the second panel 140.

FIGS. 2A and 2B both show the device 100 of FIG. 1 in the second position from a side view and a top view, respectively. The second position is also described herein as the open position, as the second panel 140 and the third panel 150 are no longer folded over the first panel 130 as shown in FIGS. 2A and 2B. Instead, the second panel 140 and the third panel 150 are hingedly open in relation to the first panel 130. Thus, as shown in FIG. 2B, when the device 100 is in the second position, the first interface 115 of the second panel 140 and the second interface 125 of the third panel 150 are exposed and accessible. In the preferred embodiment, the first interface 115 and the second interface 125 are on the front faces of the second panel 140 and the third panel 150, respectively, as shown in FIG. 2B. It will be appreciated by those skilled in the art that the first interface 115, the second interface 125, and the interface buttons 110 of the third interface can be at any location of the second panel 140 and the third panel 150, respectively. For instance, as shown in FIG. 1, interface buttons 110 of a third interface can be located on the back face of the second panel 140.

In FIG. 2B, the device 100 is in the second position and is viewed from the top. When the device 100 is in the second position, preferably the entire display 120 is exposed. Also, as described previously, the first interface 115 of the second panel 140 and the second interface 125 of the third panel 150 are exposed. The second panel 140 is hingedly coupled to a first side edge 147 of the first panel 130. Similarly, the third panel 150 is hingedly coupled to a second side edge 157 of the first panel 130. A first hinged coupler 175 joins a side edge 145 of the second panel 140 to the first side edge 147 of the first panel 130. Likewise, a second hinged coupler 185 joins a side edge 155 of the third panel 150 to the second side edge 157 of the first panel 130.

When the device 100 is in the second position, an operator can selectively access the first interface 115 alone, the second interface 125 alone, and both the first interface 115 and the second interface 125. This selective access of interfaces is convenient, since the electronic device 100 can be held in the palms of an operator's hands while the first interface 115 and the second interface 125 are accessible when the device 100 is in the second position. Preferably, an operator can rest the second panel 140 and the second panel 150 of the electronic device 100 in his hands, while accessing the first interface 115 and the second interface 125 with his thumbs.

Figure 3A:
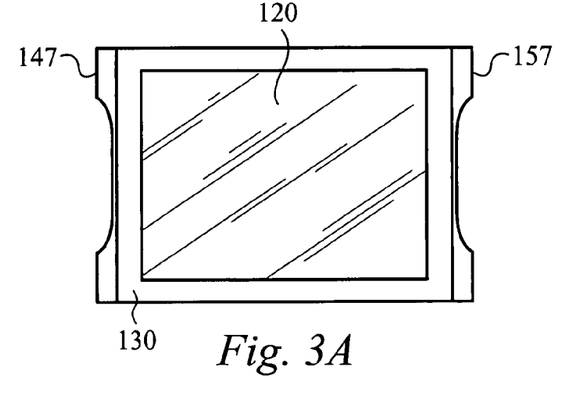
FIGS. 3A and 3B are schematic drawings illustrating the first, second, and third steps of a method of manufacturing of the electronic device of FIG. 1, in accordance with the preferred embodiment of the present invention.
Figure 3B:
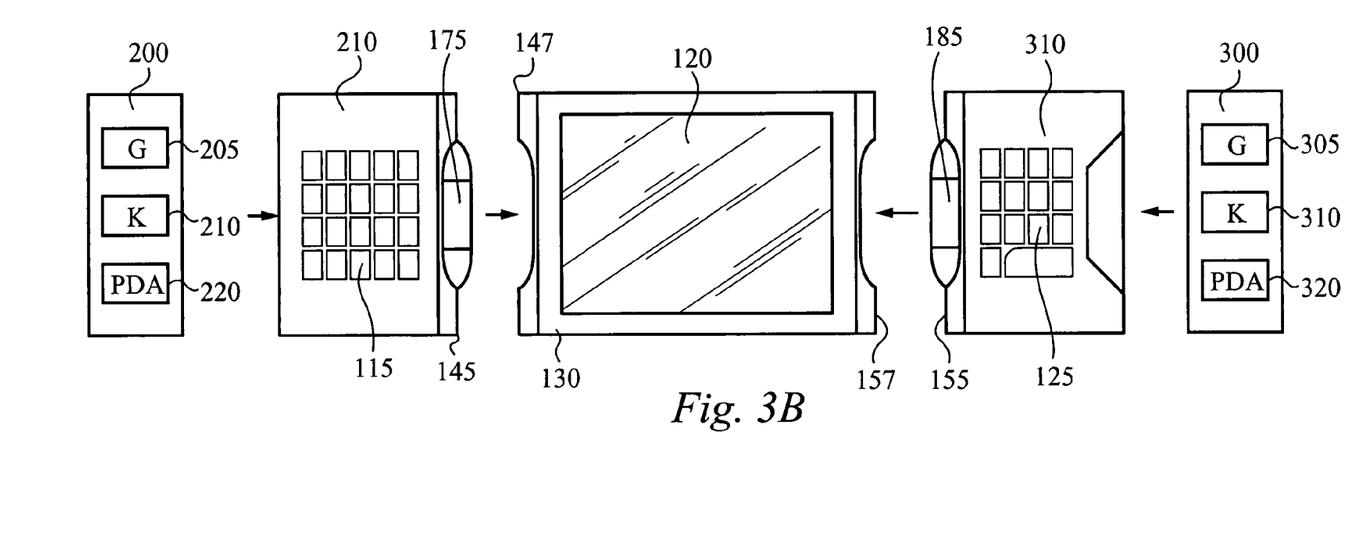

The present invention is directed to a method of manufacturing the electronic device 100. Such a method comprises of three steps, as illustrated in FIGS. 3A and 3B. As shown in FIG. 3A, the first step of the method is the providing of a first substantially planar panel 130. The first panel 130 includes a display 120 and has a first side edge 147 and a second side edge 157. Although FIG. 3A shows the preferred embodiment of the display 120 encompassing nearly the entire first panel 130, it will be appreciated by those skilled in the art that the display 120 can be located anywhere on the first panel 130 and the display 120 can be of any size and shape. It will be appreciated that the first panel 130 includes electronic circuits for driving the display 120 and for controlling the device 100 (FIG. 1).

Turning to FIG. 3B, the second step of the method of manufacturing the electronic device 100 is hingedly coupling a second substantially planar panel 210 to the first side edge 147 of the first panel 130. The second panel 210 includes a first interface 115 and is selected from a first set of panels 200. Preferably the second panel 210 includes a third interface on an opposite face from the first interface 115. The third interface is preferably a music playing interface, such as for MP3 music files, such that the device 100 can play music while the flaps are closed when the device 100 is in the first position. However, in certain alternative embodiments, no music playing interface is present on the back of the second panel 210.

In the example shown in FIG. 3B, the first set of panels 200 includes a gaming panel 205, a keyboard panel 210, and a PDA panel 220. The gaming panel 205 includes a gaming interface, the keyboard panel 210 includes a keyboard interface, and the PDA panel 220 includes a PDA interface. It will be appreciated by those skilled in the art that the first set of panels 200 can include any number of plurality of panels, and the panels themselves can include a wide range of interfaces. For instance, in the preferred embodiment, as previously discussed, the second panel 210 includes a third interface on the opposite face from the first interface 115.

Still referring to FIG. 3B, in the second step of the method of manufacturing, one of the first set of panels 200 is selected. In the example shown in FIG. 3B, the keyboard panel 210 is selected from the first set of panels 200. The keyboard panel 210 comprises a keyboard interface 115, a side edge 145 and a first hinged coupler 175. The keyboard panel 210 is then hingedly coupled to the first side edge 147 of the first panel 130. Thus, the first hinged coupler 175 joins the side edge 145 of the keyboard panel 210 to the first side edge 147 of the first panel 130 in the second step of the method of manufacturing, according to the preferred embodiment of the present invention. At the end of the second step of the method of manufacturing, the first panel 130 including the display 120 is hingedly coupled to the second panel 210.

Still referring to FIG. 3B, the third step of the method of manufacturing the electronic device 100 (FIG. 1) requires the hingedly coupling of a third substantially planar panel 310 to the second side edge 157 of the first panel 130. The third panel 310 is selected from a second set of panels 300 and includes a second interface 125. In the example shown in FIG. 3B, the second set of panels 300 included a gaming panel 305, a keyboard panel 310 and a PDA panel 320. Still referring to the example shown in FIG. 3B, the third panel is the keyboard panel 310 selected from the second set of panels 300. The third panel 310 includes a keyboard interface 125, a second hinged coupler 185, and a side edge 155. During the third step of manufacturing, the third panel 310 is hingedly coupled to the second side edge 157 of the first panel 130. The second hinged coupler 185 joins the second side edge 157 of the first panel 130 to the side edge 155 of the third panel 310.

Upon completion of the third step of manufacturing, the electronic device 100 (FIG. 1) is completely assembled in accordance to the preferred embodiment of the present invention with the interface buttons 110 of the third interface exposed and the first interface (not shown) and the second interface (not shown) obscured. FIG. 1 is a top view of the completed device 100 in the first position and FIG. 2B is a top view of the completed device 100 in the second position, upon completion of the preferred embodiment of the three-step method of manufacturing. When the device 100 is in the second position, as shown in FIG. 2B, an operator can selectively access the first interface 115 alone, the second interface 125 alone, and both the first interface 115 and the second interface 125.

At this juncture, it should be noted that the panels of the device 100 are interchangeable during the stage of manufacturing due to the flexibility of the method of manufacturing of the present invention. Thus, turning to FIG. 3B, a manufacturer can manufacture a PED having keyboard panels as the second panel 210 and third panel 310 (as shown in FIG. 3B), and within a short time, just as easily manufacture another PED having a gaming panel 205 from the first set of panels 200 for the second panel and a PDA panel 320 from the second set of panels 300 for the third panel. Also, this invention advantageously allows for a manufacturer to make modifications to existing PED design, by increasing the number of interface-carrying panels in the first set of panels 200 and the second set of panels 300 without limitation. Thus, it will be appreciated by those skilled in the art that the first set of panels 200 and the second set of panels 300 are not restricted to the panels illustrated in FIG. 3B. Instead, the first set of panels 200 and the second set of panels 300 can include a myriad of panels having a vast variety of interfaces.

Also, it will be further appreciated by those skilled in the art that there are no limitations on the numbers and types of possible combinations of the second panel 140 (FIG. 2B)

and the third panel (FIG. 2B) of the device 100 (FIG. 1). For instance, turning to FIG. 3B, out of the choices of panels of the first set of panels 200 and the second set of panels 300, a manufacturer can manufacture PEDs having the following possible combinations: (1) two gaming panels, 205 and 305; (2) one gaming panel 205 and one keyboard panel 310; (3) one gaming panel 205 and one PDA panel 320; (4) one keyboard panel 210 and one PDA panel 320, or (5) two PDA panels, 220 and 320. However, FIG. 3B is for illustrative purposes only, and the combinations of the second panel and the third panel are only limited to the types of existing interface-carrying panels present in the first set of panels 200 and the second set of panels 300.

Figures 4A, 4B:
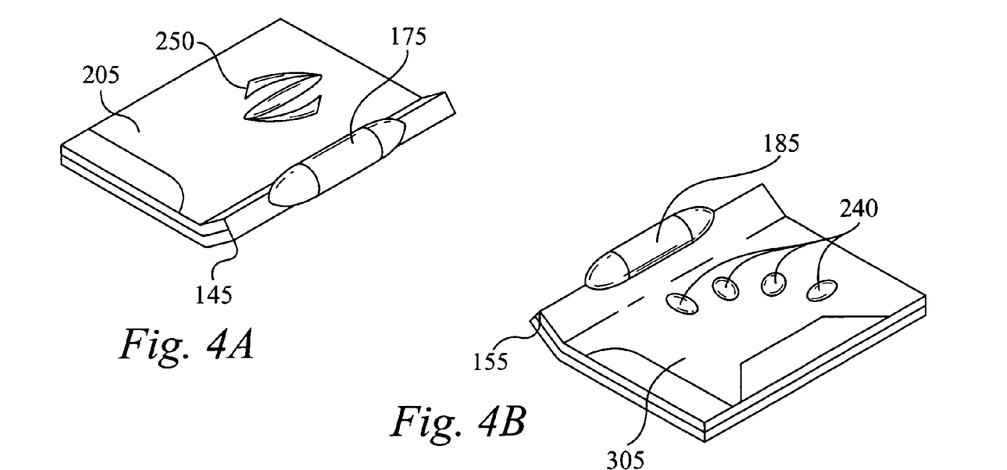
FIGS. 4A, 4B, 4C, and 4D are schematic drawings showing different embodiments of the second and third panels of the electronic device of FIG. 1.

FIGS. 4A, 4B, 4C, and 4D show only several of the many possible interchangeable panels for the device 100 (FIG. 1). In FIG. 4A, a gaming panel 205 to serve as the second panel selected from the first set of panels 200 (FIG. 3B) includes a first hinged coupler 175 and a side edge 145. The gaming panel 205 also includes a gaming keypad 250. In FIG. 4B, a second gaming panel 305 selected from the second set of panels 300 (FIG. 3B) is shown to serve as a third panel to the device 100 (FIG. 1). The second gaming panel 305 includes a second hinged coupler 185, a plurality of gaming keys 240, and a side edge 155.

Figure 4C:
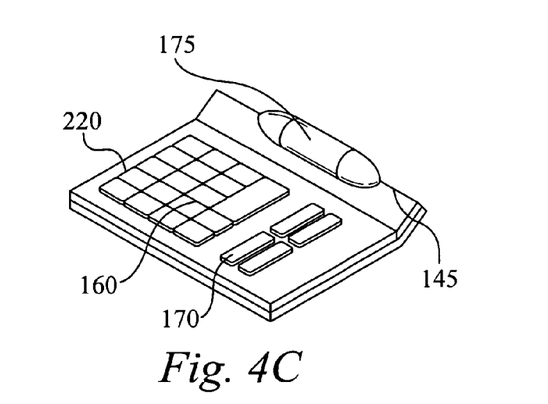
Figure 4D:
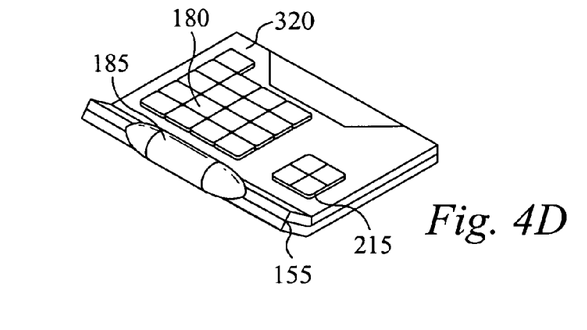

In FIG. 4C, a PDA panel 220, selected from the first set of panels 200 (FIG. 3B) and configured to serve as a second panel to the device 100 (FIG. 1), includes a first PDA keypad 160 and a plurality of PDA function keys 170. Also, the PDA panel 220 includes a first hinged coupler 175 and a side edge 145. In FIG. 4D, a second PDA panel 320, selected from the second set of panels 300 (FIG. 3B) and configured to serve as a third panel to the device 100 (FIG. 1), includes a second PDA keypad 180, a plurality of soft keys 215, a second coupler 185, and a side edge 155. As mentioned previously, the panels of the device 100 (FIG. 1) are interchangeable, and thus it will be appreciated to those skilled in the art that the panels shown in FIGS. 4A, 4B, 4C, and 4D can be mixed and matched to provide a number of possible combinations of PEDs. Thus, a pair of panels, one selected from the first set of panels 200 (FIG. 3B) and one selected from the second set of panels (FIG. 3B), can configure the electronic device 100 (FIG. 1) to operate as a music listening device, a gamer device or as an entertainment device. Alternatively, the pair of panels can collectively form a keyboard panel, a gaming panel, or a PDA panel of the device 100.

Referring back to FIG. 2B, the method of manufacturing further comprises the step of operatively coupling the first panel 130 to both the second panel 140 and the third panel 150. Also, the first panel 130, the second panel 140, and the third panel 150 are configured to exchange electronic data signals. When the device 100 is configured in the first position, as shown in FIG. 1, no interface controls the display 120. Thus, the display 120 does not respond to any entries made on any interface on the first panel 130, the second panel 140, and the third panel 150. Alternatively, when the device 100 includes a third interface with interface buttons 110, as shown in FIG. 1, the third interface controls at least the exposed portion of the display 120 when the device 100 is in the first position. Furthermore, when the device 100 is configured in the second position, as shown in FIG. 2B, the display 120 is selectively controllable by the first interface 115 alone, the second interface 125 alone, and both the first interface 115 and the second interface 125. In the preferred embodiment, when the device 100 is in the second position, the display 120 is controllable by both the first interface 115 and the second interface 125 simultaneously.

Figure 5:
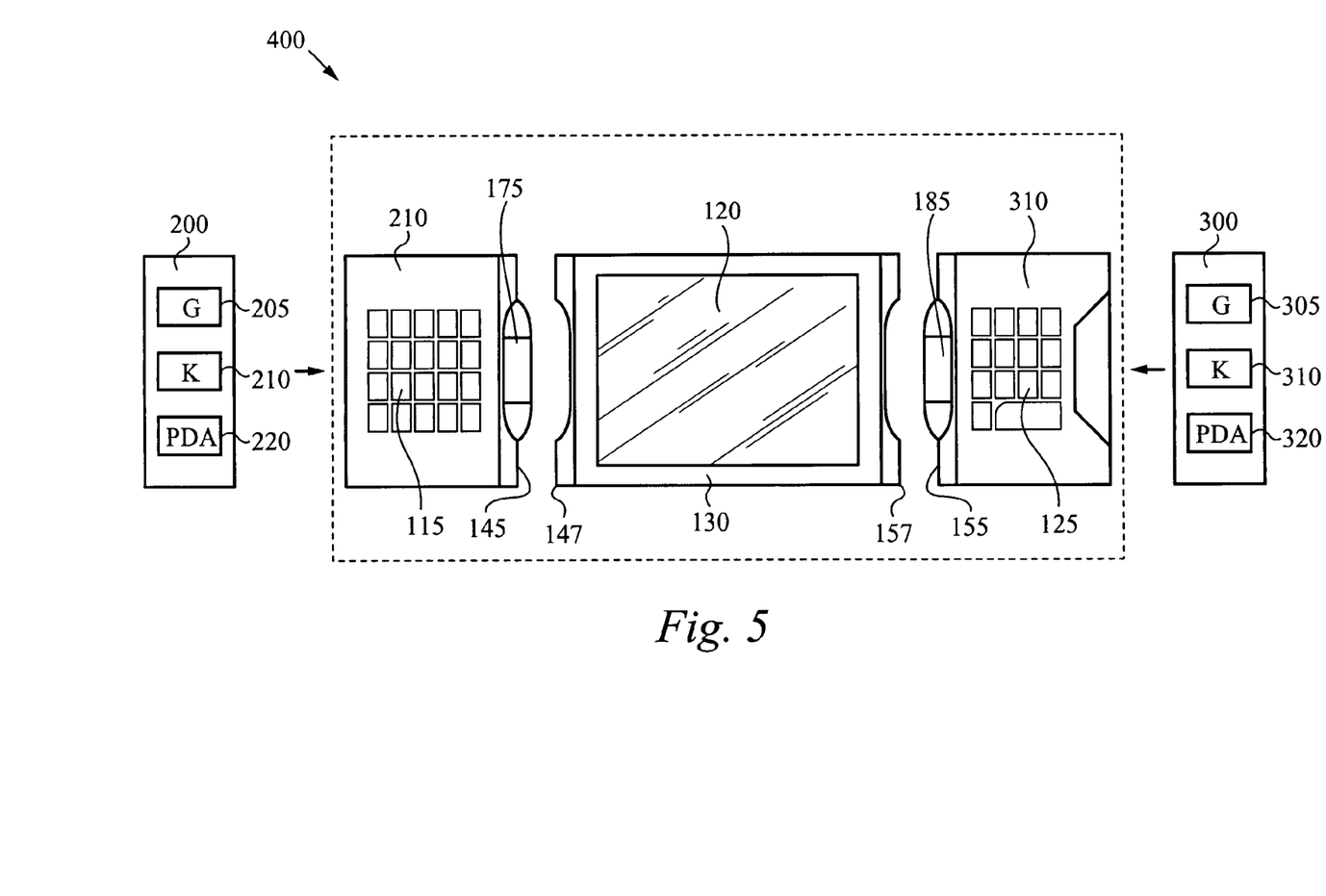
FIG. 5 is a schematic drawing of a kit to assemble the electronic device of FIG. 1.

In yet another embodiment of the present invention, as shown in FIG. 5, a kit 400 to assemble an electronic device 100 (FIG. 1) comprises three substantially planar panels. A first panel 130 includes a display 120, a first side edge 147 and a second side edge 157. A second panel 210 includes a first interface 115 and is configured to be hingedly coupled to the first side edge 147 of the first panel 130. A third panel 310 includes a second interface 125 and is configured to be hingedly coupled to the second side edge 155 of the first panel 130. Upon assembling the device 100 (FIG. 1) from the kit 500, the device 100 shall have the appearance as shown in FIG. 1 (for the first position), 2A and 2B (for the second position). Thus, when the device 100 is in a first position, as shown in FIG. 1, the first interface 115 and the second interface 125 are obscured while the interface buttons 110 of the third interface exposed, in the preferred embodiment. When the device 100 is in a second position, as shown in FIG. 2B, the first interface 115 and the second interface 125 are exposed while the third interface is exposed. An operator can selectively access the first interface 115 alone, the second interface 125 alone, and both the first interface 115 and the second interface 125 when the device 100 is in the second position (FIG. 2B).

Still referring to FIG. 5, the first panel 130 of the kit 400 is configured to be operatively coupled to both the second panel 210 and the third panel 310. The second panel 210 is selected from a first set of panels 200, which includes a gaming panel 205, a keyboard panel 210, and a PDA panel 220. The third panel 310 is selected from a first set of panels 300, which includes a gaming panel 305, a keyboard panel 310, and a PDA panel 320. In the example shown in FIG. 5, the kit 400 is comprised of a first keyboard panel 210 selected from the first set of panels 200, as well a second keyboard panel 310 selected from the second set of panels 300. The first panel 130, the second panel 210, and the third panel 310 of the kit 400 are configured to exchange electronic data signals. Upon completion of assembling the device 100 (FIG. 1) from the kit 400, when the device 100 is configured in the first position, no interface controls the display 120. When the device 100 is configured in the second position (FIG. 2B), the device 100 is selectively controllable by the first interface 115 alone, the second interface 125 alone, and both the first interface 115 and the second interface 125. In the preferred embodiment, when the device 100 is in the second position (FIG. 2B), the device 100 is controllable by both the first interface 115 and second interface 125 simultaneously.

It will be appreciated by those skilled in the art that the electronic device 100 (FIG. 1) assembled from the kit 400 can take on a number of forms and functions, based on the combinations of the second panel 210 (FIG. 5) and the third panel 310 (FIG. 5) of the device 100. Thus, based on the specific pair of panels, one selected from the first set of panels 200 (FIG. 5) and one selected from the second set of panels 300 (FIG. 5), the electronic device 100 can be configured to operate as a gamer device, a music listening device, an entertainment device, and the like. Furthermore, the pair of panels can be configured to collectively form a keyboard panel, a gaming panel, a PDA panel, and any other type of collective panel. Also, if the kit 400 is provided after manufacturing, the second panel 210 and the third panel 310 are fixed. However, if the kit 400 is provided during manufacturing, the second panel 210 and the third panel 310 are interchangeable. If the second panel 210 and the third panel 310 are interchangeable, it will be appreciated by those skilled in the art that the device 100 (FIG. 1) can recognize the second panel 210 and the third panel 310, including the first interface 115 and the second interface 125. Preferably, the device 100 will include a ROM chip and utilize software for panel and interface recognition.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

What is claimed is:

1. A method of manufacturing an electronic device comprising the steps of:
   a. providing a first substantially planar panel including a display and having a first side edge and a second side edge;
   b. hingedly coupling a second substantially planar panel selected from a first set of panels to the first side edge of the first substantially planar panel, the second panel including a first interface; and
   c. hingedly coupling a third substantially planar panel selected from a second set of panels to the second side edge of the first panel, the third panel including a second interface, such that when the device is in a first position the first interface and the second interface are obscured wherein the second substantially planar panel partially covers the first substantially planar panel and the third substantially planar panel covers at least a portion of a remainder of the first substantially planar panel and when the device is in a second position the first interface and the second interface are exposed and further wherein an operator can selectively access the first interface alone, the second interface alone, and both the first interface and the second interface when the device is in the second position.

2. The method according to claim 1, wherein the method further comprises the step of operatively coupling the first panel to the second panel and the third panel, wherein the first panel, the second panel, and the third panel are configured to exchange electronic data signals and further wherein when the device is configured in the first position, no interface controls the display and when the device is configured in the second position the display is selectively controllable by the first interface alone, the second interface alone, and both the first interface and the second interface.

3. The method according to claim 1, wherein a pair of panels, one selected from the first set of panels and one selected from the second set of panels, configures the electronic device to operate as a gamer device.

4. The method according to claim 1, wherein a pair of panels, one selected from the first set of panels and one selected from the second set of panels, configures the electronic device to operate as a music listening device.

5. The method according to claim 1, wherein a pair of panels, one selected from the first set of panels and one selected from the second set of panels, collectively forms a keyboard panel.

6. The method according to claim 1, wherein a pair of panels, one selected from the first set of panels and one selected from the second set of panels, collectively forms a gaming panel.

7. The method according to claim 1, wherein a pair of panels, one selected from the first set of panels and one selected from the second set of panels, collectively forms a PDA panel.

8. The method according to claim 1, wherein a pair of panels, one selected from the first set of panels and one selected from the second set of panels, configures the electronic device to operate as a personal entertainment device.

9. The method according to claim 1, wherein the device further comprises a third interface.

10. The method according to claim 9, wherein the second panel further includes the third interface.

11. The method according to claim 9, wherein when the device is configured in one of the first position and the second position, the third interface is exposed.

12. The method according to claim 9, wherein when the device is configured in the first position, the third interface controls the display.

13. A kit to assemble an electronic device, the kit comprising:
    a. a first substantially planar panel, the first panel including a display and having a first side edge and a second side edge;
    b. a second substantially planar panel selected from a first set of panels, the second panel including a first interface and configured to be hingedly coupled to the first side edge of the first panel; and
    c. a third substantially planar panel selected from a second set of panels, the third panel including a second interface and configured to be hingedly coupled to the second side edge of the first panel, such that when the device is in a first position the first interface and the second interface are obscured wherein the second substantially planar panel partially covers the first substantially planar panel and the third substantially planar panel covers at least a portion of a remainder of the first substantially planar panel and when the device is in a second position the first interface and the second interface are exposed and further wherein an operator can selectively access the first interface alone, the second interface alone, and both the first interface and the second interface when the device is in the second position.

14. The kit according to claim 13, wherein the first panel is configured to be operatively coupled to both the second panel and the third panel, wherein the first panel, the second panel, and the third panel are configured to exchange electronic data signals, and further wherein when the device is configured in the first position, no interface controls the display and when the device is configured in the second position the display is selectively controllable by the first interface alone, the second interface alone, and both the first interface and the second interface.

15. The kit according to claim 13, wherein a pair of panels, one selected from the first set of panels and one selected from the second set of panels, configures the electronic device to operate as a gamer device.

16. The kit according to claim 13, wherein a pair of panels, one selected from the first set of panels and one selected from the second set of panels, configures the electronic device to operate as a music listening device.

17. The kit according to claim 13, wherein a pair of panels, one selected from the first set of panels and one selected from the second set of panels, is configured to collectively form a keyboard panel.

18. The kit according to claim 13, wherein a pair of panels, one selected from the first set of panels and one selected from the second set of panels, is configured to collectively form a PDA panel.

19. The kit according to claim 13, wherein a pair of panels, one selected from the first set of panels and one selected from the second set of panels, is configured to collectively form a gaming panel.

20. The kit according to claim 13, wherein a pair of panels, one selected from the first set of panels and one selected from the second set of panels, configures the electronic device to operate as a personal entertainment device.

21. The kit according to claim 13, wherein the device further comprises a third interface.

22. The kit according to claim 21, wherein the second panel further includes the third interface.

23. The kit according to claim 21, wherein when the device is configured in one of the first position and the second position, the third interface is exposed.

24. The kit according to claim 21, wherein when the device is configured in the first position, the third interface controls the display.

* * * * *

UNITED STATES PATENT AND TRADEMARK OFFICE
CERTIFICATE OF CORRECTION

PATENT NO. : 7,054,146 B2 Page 1 of 1
APPLICATION NO. : 10/781399
DATED : May 30, 2006
INVENTOR(S) : Thomas Sutton and Gabriele Diotti

It is certified that error appears in the above-identified patent and that said Letters Patent is hereby corrected as shown below:

On Title page, col. 1,

Item 73, Assignee, on the initial page, please replace "Flextroncis" with -- Flextronics --.

Signed and Sealed this

Fifteenth Day of August, 2006

JON W. DUDAS
*Director of the United States Patent and Trademark Office*